Patented Apr. 3, 1951

2,547,917

UNITED STATES PATENT OFFICE 2,547,917

PROCESS FOR MAKING PREGNANE DERIVATIVES SUBSTITUTED IN 21-POSITION

Albert Wettstein and Charles Meystre, Basel, Switzerland, assignors to Ciba Pharmaceutical Products, Inc., Summit, N. J.

No Drawing. Application December 8, 1947, Serial No. 790,442. In Switzerland December 13, 1946

12 Claims. (Cl. 260—397.4)

This invention provides a process for making pregnane-20-one derivatives substituted in the 21-position in specially advantageous manner.

The process consists in the oxidative degradation of the side chain in a $\Delta^{20,23}$-choladiene which in the 21-position contains a halogen atom or an esterified or etherified hydroxyl group, to form the 20-ketone and in treating a resulting 21-halogen-pregnane-20-one with an agent capable of exchanging an aliphatically bound halogen atom for a free, esterified or etherified hydroxyl group.

The $\Delta^{20,23}$-21-halogen-choladienes to be used as starting materials in the present process are obtainable by the process disclosed in U. S. patent application No. 741,954, filed April 16, 1947. The $\Delta^{20,23}$-choladienes which in the 21-position contain an esterified or etherified hydroxyl group can be prepared from the aforementioned $\Delta^{20,23}$-halogen-choladienes by treating them with agents which are capable of exchanging an aliphatically bound halogen atom for an esterified or etherified hydroxyl group. They may be of any desired configuration. In the side chain they contain conjugated carbon-to-carbon double bonds, and, besides, are either saturated or unsaturated, for example, in the 4-, 5-, 7-, 11-, 14- and/or 16-position. In addition to the substituent in the 21-position they may contain any desired further substituents, especially hydroxyl, acyloxy, alkoxy, aryloxy and/or keto groups, for example, in the 3-, 7-, 11- and/or 12-position; or halogen atoms, for example, in the 4-, 5- or 6-position; or aryl or alkyl groups, for example, in the 24-position.

According to the invention, the diene side chain is directly or indirectly degraded by means of an oxidising agent to yield the 20-ketone substituted at the 21-position. There may be mentioned for this purpose, for example, oxidation by means of a compound of hexavalent chromium, such as chromic acid; permanganate; ozonisation and splitting of the ozonide; the action of peroxides, such as perbenzoic acid, monoperphthalic acid or hydrogen peroxide, advantageously in the presence of osmium tetroxide, and the splitting, for example by means of chromic acid, lead tetracetate or periodic acid, of the glycol formed by hydrolysis of the oxido-ring or by the direct addition of two hydroxyl groups on to the double bond.

During the oxidation double bonds in the cyclopentanopolyhydrophenanthrene nucleus are advantageously protected, for example, by means of halogen or hydrogen halide, provided that such protection is not unnecessary owing to the special properties of the unsaturated system as, for example, in the case of a double bond having a keto-group in $\alpha$-position thereto or of a double bond in the 11,12-position. Furthermore, oxidisable substituents, for example hydroxyl groups, may be protected in known manner, for instance by esterification or etherification, and, if desired, wholly or in part reconstituted after the oxidation, for example by the action of a hydrolysing agent. If, however, it is desired to convert a free carbinol group in the ring into a keto-group, this may be brought about in a manner in itself known concurrently with the oxidative degradation of the side chain or in a separate reaction, more especially by the action of an oxidising or dehydrogenating agent. For this purpose there may be used as oxidising agents, for example chromic acid, permanganate or the like; or as dehydrogenating agents especially metal alcoholates or metal phenolates together with carbonyl compounds (the exchange of oxidation stages), or, for example, metal powders with the action of heat under reduced pressure. Also in the case of oxidising carbinol groups in the ring any carbon-to-carbon double bonds present may, if desired, be protected in the manner indicated.

If, as a result of the oxidation, a 21-halogen-pregnane-20-one is obtained, it may be converted by means of a hydrolysing agent, for example by means of an aqueous solvent, namely a mixture of water and an inert organic solvent, such as dilute acetone or dilute dioxane, into a 21-oxy-compound; or by means of an appropriate reesterifying agent, for example a salt of a carboxylic or sulphonic acid, such as a salt of acetic acid, propionic acid or benzoic acid or a salt of methane sulphonic acid or toluene sulphonic acid, into an esterified 21-oxy-compound or by means of an etherifying agent, for example an alcohol or a phenol such as methanol, ethanol, benzyl alcohol, a tetracyl-glucose or a heptacyl-lactose, or the corresponding alcoholates or phenolates, into an etherified 21-oxy-compound.

These reactions generally occur very smoothly at room temperature or with the application of heat, owing to high reactivity of the 21-halogen atom. When aqueous solvents or alcohols or phenols are used in the reaction, agents capable of binding acid may be added for the purpose of removing hydrogen halide which is formed, for example, solutions or suspensions of metal carbonates or metal hydroxides, such as carbonates or hydroxides of alkaline earth metals, of alkalis or of silver. The treatment with reesterifying agents is carried out in suspension or in solution with the use, for example, of the corresponding carboxylic acids and, if desired, anhydrides thereof, and of organic, aqueous-organic or inert solvents or diluents. Similarly, the alcoholates or phenolates may be brought into reaction in solution, especially in the corresponding alcohols, or in suspension, for example, in an inert solvent.

At any desired reaction stage the whole or a part of the hydroxyl groups present in esterified or etherified form may be regenerated, or esterified or etherified hydroxyl groups may be split off with the formation of a carbon-to-carbon double bond. In the case of acylated or etherified hydroxyl groups this may be brought about, for example, by the action of a hydrolysing agent, such as an alkaline or acid reagent, or by the action of heat; in the case of hydrohalic acid esters by the action of an alkaline agent, a carboxylic acid salt or a tertiary amine; and in the case of sulphonic acid esters by means of a tertiary amine or by the action of heat.

Finally, free hydroxyl groups may be treated, likewise at any desired reaction stage, with an esterifying or etherifying agent. Thus, for example, there may be obtained by a method in itself known acyl derivatives such as acetates, propionates, benzoates or anthraquinone carboxylic acid esters; sulphonic acid esters, such as methane sulphonates or tosylates; carbonic acid esters, such as alkyl carbonates; or ethers, such as methyl, ethyl or trityl ethers or glucosides and the like. The products of the invention can be isolated and purified in the usual manner, for example, by recrystallisation, chromatography, sublimation or reaction with ketone reagents, especially those yielding water-soluble condensation products. It has been found especially suitable to bring about purification by taking the product up in an organic solvent immiscible with water, extracting the solution with a strong mineral acid, and precipitating the product from the mineral acid solution with water.

The products of the invention find therapeutic application or are intermediate products suitable for the manufacture of medicaments.

The following examples illustrate the invention, the parts being by weight unless otherwise stated, and the relationship of parts by weight to parts by volume being the same as that of the gram to the cubic centimetre.

Example 1

In order to obtain the starting material for this example, 10 parts of $\Delta^{20,23}$-3,12-diacetoxy-21-bromo-24,24-diphenyl-choladiene obtainable, for example, by the action of N-bromo-succinimide on $\Delta^{20,23}$ - 3,12 - diacetoxy - 24,24 - diphenyl-choladiene with exposure to light (Ser. No. 741,954, filed April 16, 1947) and 10 parts of anhydrous potassium acetate are heated on the water-bath in 100 parts by volume of pure glacial acetic acid for 2 hours with the exclusion of moisture, complete dissolution taking place at the outset. The solution is then evaporated under reduced pressure, the residue is mixed with water, and extracted with ether. The ethereal solution is washed with water, dried and evaporated. The crude $\Delta^{20,23}$ - 3,12,21 - triacetoxy-24,24-diphenyl-choladiene so obtained is recrystallised, for example, from a mixture of acetone and methanol. The pure substance melts at 175–177° C.

For the further treatment either the pure or the crude triacetoxy-diene may be used. Thus, for example, 2 parts of the pure compound in 25 parts by volume of ethylene chloride and 50 parts by volume of glacial acetic acid are mixed at −5° C. to −10° C., with a solution of 1.25 parts of chromium trioxide in 8 parts by volume of water, and the whole is allowed to stand for 20 hours at 0° C. The unconsumed chromic acid is then cautiously decomposed with a solution of sodium bisulphite at a low temperature, and the solution is concentrated by evaporation under reduced pressure while repeated additions of water are made. The aqueous suspension is extracted with a mixture of ether and chloroform (4:1), the extract is washed in turn with water, a dilute sodium carbonate solution and water, dried, and then evaporated. By recrystallisation of the residue from hexane the known 3,12,21-triacetoxy-pregnane-20-one melting at 153–153.5° C. is obtained. A further quantity of the same triacetate can be recovered from the mother liquors by the extraction of their solutions in benzene with strong sulphuric acid or by chromatographic separation.

By subjecting the resulting triacetoxy-pregnanone to alkaline hydrolysis 3,12,21-trioxy-pregnane-20-one is obtained. Proof of the constitution of these compounds is supported by the oxidation of the triole with chromic acid to the known 3,12-diketo-aetio-cholanic acid and esterification to form the corresponding methyl ester.

The conversion of the $\Delta^{20,23}$-3,12-diacetoxy-21-bromo-24,24-diphenyl-choladiene into $\Delta^{20,23}$-3,12,21 - triacetoxy - 24,24 - diphenyl - choladiene may also be carried out as follows:

10 parts of $\Delta^{20,23}$ - 3,12 - diacetoxy - 21 - bromo-24,24-diphenyl-choladiene are heated in a mixture of 500 parts by volume of acetone (or dioxane) and 100 parts by volume of water (with or without the addition of potassium acetate or calcium carbonate) for several hours on the water-bath. The solution, which contains $\Delta^{20,23}$-3,12-diacetoxy-21-oxy - 24,24 - diphenyl - choladiene, is concentrated by evaporation under reduced pressure, the aqueous suspension is extracted with ether, the ethereal solution is washed with water, dried and evaporated. Upon recrystallisation from methanol the residue yields the pure 21-oxy-diene having the two melting points 123–125° C. and 167–169° C. The product is then mixed with 5 parts by volume of pyridine and 10 parts by volume of acetic anhydride, and the whole is maintained for 15 hours in the cold or for 1 hour on the boiling water-bath, and the solution is concentrated by evaporation under reduced pressure. The residue is taken up in ether, and the ethereal solution is washed in turn with dilute hydrochloric acid and water, dried, and evaporated. In this manner crude $\Delta^{20,23}$-3,12,21-triacetoxy - 24,24-diphenyl-choladiene is obtained, which is purified as described above or further worked up in the crude state.

Example 2

5 parts of $\Delta^{20,23}$-3,12-diacetoxy-21-bromo-24,24-diphenyl-choladiene in 50 parts by volume of ethylene chloride and 100 parts by volume of glacial acetic acid are mixed at −5° to −10° C. with a solution of 3 parts of chromium trioxide in 20 parts by volume of water, and the whole is allowed to stand for 20 hours at 0° C. The unconsumed chromic acid is then cautiously decomposed with a solution of sodium bisulphite at a low temperature, and the solution is concentrated by evaporation under reduced pressure with the repeated addition of water. The resulting aqueous suspension is extracted by agitation with a mixture of ether and chloroform (4:1), and the solution is washed in turn with water, dilute sodium carbonate solution and water, dried, and evaporated. The residue contains crude 3,12-diacetoxy-21-bromo-pregnane-20-one, which is difficult to isolate as such and is therefore further worked up without purification.

The crude bromide is heated with 5 parts of potassium acetate in 50 parts by volume of glacial acetic acid for 4 hours on the boiling water-bath, and the solution is then mixed with water and concentrated by evaporation under reduced pressure. The resulting aqueous suspension is extracted by agitation with a mixture of ether and chloroform (4:1), and the ether-chloroform solution is washed in turn with water, dilute sodium carbonate solution and water, dried and evaporated. The residue is advantageously subjected to chromatographic separation by means of aluminium oxide. The 3,12,21-triacetoxy-pregnane-20-one described in Example 1 is obtained more especially from the benzene fractions, and is recrystallised from hexane.

A crude 3,12-diacetoxy-21-bromo-pregnane-20-one obtained from 5 parts of $\Delta^{20,23}$-3,12-diacetoxy-21-bromo-24,24-diphenyl-choladiene can also be worked up in the following manner:

It is dissolved in 50 parts by volume of methanol, the solution is mixed with 2 parts by volume of concentrated hydrochloric acid, and the whole is heated at the boil for one hour. After diluting the solution with water and evaporation under reduced pressure, the residue is extracted with a mixture of ether and chloroform (4:1), the extract is washed in turn with water, dilute sodium carbonate solution and water, dried, and evaporated. The residue is dissolved in isopropyl ether and petroleum ether is added, whereby a viscous oil is precipitated. The supernatant solution is poured off to leave impurities behind, and evaporated. The residue is taken up in isopropyl ether, and upon allowing the solution to stand pure 3,12-dioxy-21-bromo-pregnane-20-one melting at 148–150° C. crystallises.

The latter bromo-derivative is reacted with potassium acetate in glacial acetic acid on the boiling water-bath in an entirely analogous manner to that described above, and then reacetylated by means of pyridine and acetic anhydride to yield 3,12,21-triacetoxy-pregnane-20-one. It is in all respects identical with the compound obtained in the manner previously described above, and can be hydrolysed to 3,12,21-trioxy-pregnane-20-one as described in Example 1.

Example 3

In order to obtain the starting material for this example, 4 parts of $\Delta^{20,23}$-3-keto-12-acetoxy-21-bromo-24,24-diphenyl-choladiene obtainable, for example, by the action of N-bromo-succinimide on $\Delta^{20,23}$-3-keto-12-acetoxy-24,24-diphenyl-choladiene with exposure to light (Serial No. 741,954, filed April 16, 1947) are dissolved in 40 parts by volume of glacial acetic acid and 10 parts by volume of acetic anhydride and the whole is heated with 4 parts of anhydrous potassium acetate for 2 hours on the boiling water-bath. 4 parts of $\Delta^{20,23}$-3-keto-12-acetoxy-21-bromo-24,24-diphenyl-choladiene may also be dissolved in 20 parts by volume of benzene and 20 parts by volume of glacial acetic acid, the whole may be mixed with a solution of 20 parts of anhydrous potassium acetate in 20 parts by volume of glacial acetic acid, and the solution allowed to stand for 20 hours at room temperature. The solution is then evaporated under reduced pressure, the residue is mixed with water, and the aqueous suspension is extracted with a mixture of ether and chloroform (4:1). The ether-chloroform solution is washed with water, dried, and evaporated. The residue contains $\Delta^{20,23}$-3-keto-12,21-diacetoxy-24,24-diphenyl-choladiene. This may be recrystallised from isopropyl ether or a mixture of ether and pentane and melts at 186–188° C.

The reaction product is taken up in 50 parts by volume of ethylene chloride and 100 parts by volume of glacial acetic acid, mixed at −10° C. with a solution of 2.8 parts of chromium trioxide in 20 parts by volume of water, and allowed to stand at 0° C. for 20 hours. The excess of chromic acid is then cautiously decomposed with sodium bisulphite solution at a low temperature, and the solution is concentrated by evaporation under reduced pressure with the repeated addition of water. The resulting aqueous suspension is extracted with a mixture of ether and chloroform (4:1), and the extract is washed in turn with water, dilute sodium carbonate solution and water, dried and evaporated. The residue, amounting to 3.6 parts, is advantageously purified by chromatography with aluminium oxide. From the fractions obtained with a mixture of hexane and benzene there is obtained by recrystallisation from isopropyl ether or from a mixture of ether and pentane the known 3,20-diketo-12,21-diacetoxy-pregnane, which crystallises in dimorphic forms melting at 112–114° C. and 122–124° C. By recrystallisation from ethanol this compound is obtained in a further form melting at 58–64° C. Alternatively, it may be extracted from the benzene solution thereof by means of strong sulphuric acid, and thereby purified.

Instead of $\Delta^{20,23}$-3-keto-12-acetoxy-21-bromo-24,24-diphenyl-choladiene, another ester, for example, the 12-benzoate or 12-anthraquinone carboxylic acid ester, may be used as starting material, and the corresponding 12,21-diester so obtained.

Example 4

In order to prepare the starting material 10 parts of $\Delta^{20,23}$-3-keto-12-para-toluene-sulphoxy-24,24-diphenyl-choladiene (obtainable for example from $\Delta^{20,23}$-3-keto-12-acetoxy-24,24-diphenyl-choladiene by alkaline hydrolysis and subsequent standing for 6 days with an excess of para-toluene sulphonic acid chloride in pyridine) are converted by the action of N-bromo-succinimide with exposure to light (Ser. No. 741,954 filed April 16, 1947) into $\Delta^{20,23}$-3-keto-12-para-toluene-sulphoxy-21-bromo-24,24-diphenyl-choladiene. The resulting crude bromide is heated with 200 parts by volume of acetone and 20 parts by volume of water for 8 hours on the water bath. The acetone is then evaporated under reduced pressure, the resulting aqueous suspension is extracted with ether, the ethereal solution is washed with water, dried and evaporated. The reaction product, $\Delta^{20,23}$-3-keto-12-para-toluene-sulphoxy-21-oxy-24,24-diphenyl-choladiene, is then acetylated by allowing it to stand in 10 parts by volume of pyridine and 20 parts by volume of acetic anhydride for 15 hours. The solution is then concentrated by evaporation under reduced pressure, the residue is extracted with a mixture of ether and chloroform (4:1), the ether-chloroform solution is washed in turn with hydrochloric acid and water, dried and evaporated.

In order to split off the tosyl residue the $\Delta^{20,23}$-3-keto-12-para-toluene-sulphoxy - 21 - acetoxy-24,24-diphenyl-choladiene is heated for 15 hours with pyridine in an evacuted autoclave at 140° C. After evaporating the reaction solution the residue is taken up in ether-chloroform solution, the solution is washed in turn with dilute hydrochloric acid and water, dried and evaporated. The resulting $\Delta^{11,20,23}$-3-keto-21-acetoxy-24,24-diphenyl-cholatriene is then oxidised in the cold with 7 parts of chromium trioxide in 100 parts by volume of ethylene chloride, 200 parts by volume of glacial acetic acid and 30 parts by volume of water in a manner similar to that described in Example 3 and worked up in an analogous manner.

The neutral oxidation product contains the known $\Delta^{11}$-21-acetoxypregnene-3,20-dione. It can be purified, for example, by extracting it from a benzene solution thereof with strong sulphuric acid, diluting the sulphuric acid extract with water, extracting the diluted solution with ether, and chromatographing the extract by means of aluminium oxide. The benzene-ether elutriates are finally recrystallised from a mixture of ether and petroleum ether. The resulting $\Delta^{11}$-21-acetoxy-pregnene-3,20-dione melts at 150–151° C.

By starting from the corresponding 12-anthraquinone carboxylic acid ester, instead of $\Delta^{20,23}$-3-keto-12-paratoluene-sulphoxy-24,24-diphenyl-choladiene- this residue can be split off by the application of heat to form the 11,12-double bond.

*Example 5*

In order to obtain the starting material for this example, 2 parts of $\Delta^{20,23}$-3,12-diacetoxy-21-bromo-24,24-diphenyl-choladiene are heated with 40 parts by volume of ethanol for 2 hours on the water-bath at the boil. The reaction solution is neutralised with an alcoholic solution of sodium ethylate, and, for the purpose of subsequent acetylation, the residue resulting from the evaporation of the solution under reduced pressure is heated for 1 hour on the boiling water bath with 1 part by volume of pyridine and 2 parts by volume of acetic anhydride. The solution is then evaporated under reduced pressure with the addition of water, and the residue is taken up in ether. The ethereal solution is washed in turn with dilute hydrochloric acid and water, dried and evaporated. By recrystallising the residue from acetone $\Delta^{20,23}$-3,12-diacetoxy - 21 - ethoxy-24,24-diphenyl-choladiene melting at 177–179° C. is obtained.

The conversion of the 21-bromo-diene into the ethyl ether may also be carried out in the presence of sodium alcoholate or calcium carbonate or an inert diluent, such as benzene.

4 parts of $\Delta^{20,23}$-3,12-diacetoxy-21-ethoxy-24,24-diphenyl-choladiene are dissolved in 50 parts by volume of ethylene chloride and 100 parts by volume of glacial acetic acid, oxidised with a solution of 2.5 parts of chromium trioxide in 20 parts by volume of water for 20 hours at 0° C., and the reaction solution is worked up as hereinbefore described. The oily 3,12-diacetoxy-21-ethoxy-pregnane-20-one is boiled with a concentrated aqueous solution of 2 parts of potassium carbonate and 100 parts by volume of methanol for 1 hour in a reflux apparatus. After concentrating the solution by evaporation under reduced pressure, the suspension so obtained is extracted by agitation with ether, the ethereal solution is washed with water, dried, and evaporated.

The oily residue of 3,12-dioxy-21-ethoxy-pregnane-20-one may be dissolved in 50 parts by volume of ethylene chloride and 100 parts by volume of glacial acetic acid and oxidised with a solution of 1.2 parts of chromium trioxide in 20 parts by volume of water for 6 hours at 15° C. The oxidation solution is worked up in the manner described in the preceding examples. The neutral product is recrystallised from isopropyl ether to yield 3,12-diketo-21-ethoxy - pregnane - 20 - one melting at 178–180° C. The mother liquors are purified by chromatography over aluminium oxide. The pentane-benzene elutriates and also the benzene elutriates yield further quantities of the said triketone.

The same triketo-pregnane ether is obtained more simply in the following manner:

5 parts of $\Delta^{20,23}$-3,12-diacetoxy-21-ethoxy-24,24-diphenyl-choladiene are first boiled for 1 hour with 1.2 parts of potassium hydroxide in 100 parts by volume of ethanol in a reflux apparatus. The solution is diluted with water, and concentrated by evaporation under reduced pressure, and the aqueous suspension is extracted by agitation with ether. The ethereal solution is washed with water, dried and evaporated. The $\Delta^{20,23}$-3,12-dioxy-21-ethoxy-24,24 -diphenyl-choladiene so obtained is oxidised, in the manner described above, for 6 hours at 15° C., with 4.1 parts of chromium trioxide in a mixture of ethylene chloride-glacial acetic acid and water, and then worked up. From a solution of the crude neutral product in isopropyl ether the above described 3,12-diketo-21-ethoxy-pregnane-20-one crystallises directly.

*Example 6*

In order to obtain the starting material for this example, a solution of 10 parts of $\Delta^{20,23}$-3-acetoxy - 5-chloro-21-bromo-24,24-diphenyl-choladiene (obtainable, for example, by the action of N-bromo-succinimide on $\Delta^{20,23}$-3-acetoxy-5-chloro-24,24-diphenyl-choladiene with exposure to light [Ser. No. 741,954, filed April 16, 1947]), in 50 parts by volume of dry benzene and 50 parts by volume of pure methanol is heated for 2 hours on the water bath at the boil, and, after the addition of 1 part by volume of concentrated hydrochloric acid is boiled for a further hour. The whole is then evaporated under reduced pressure, the $\Delta^{20,23}$-3-oxy-5-chloro-21-methoxy-24,24-diphenyl-choladiene is dissolved in 120 parts by volume of ethylene chloride and 240 parts by volume of glacial acetic acid, and oxidised with a solution of 9 parts of chromium trioxide in 45 parts by volume of water for 20 hours at 0° C. The oxidation mixture is worked up in the manner described in the preceding examples. The neutral product so obtained is crude 5-chloro-21-methoxy-pregnane-3,20-dione. In order to split off hydrogen chloride from the latter product it is dissolved in 100 parts by volume of methanol of 90 per cent strength, and heated with 3 parts of potassium carbonate for 1 hour at the boil. The whole is then mixed with water, concentrated by evaporation under reduced pressure, and the aqueous suspension is extracted by agitation with a mixture of ether and chloroform (4:1). The organic solution is washed with water, dried, and evaporated. The crude desoxycorticosterone methyl ether ($\Delta^4$-21-methoxy-pregnene-3,20-dione) is advantageously taken up in benzene and extracted from the benzene solution by means of sulphuric acid of 50 per cent. strength by volume. The sulphuric acid solutions are then diluted with water and extracted with a mixture of ether and chloroform.

The ether-chloroform solution is washed in turn with caustic soda solution and water, dried, and evaporated. The residue crystallises from ether. By recrystallisation from a small quantity of acetone and methanol needles of pure desoxycorticosterone methyl ether melting at 161–165° C. are obtained. The compound does not reduce in the cold silver diamine solution in the presence of ammonia.

Instead of the above described method of purification, chromatography over aluminium oxide may be used. The methyl ether is obtained more especially from the hexane-benzene elutriates.

Example 7

For the preparation of the starting material of this example, a methanol-benzene solution of $\Delta^{20,23}$-3-oxy-5-chloro-21-methoxy-24,24-diphenylcholadiene obtained as described in Example 6 is mixed with 4 parts of potassium hydroxide, and heated on the water bath for 1 hour. The solution is concentrated by evaporation under reduced pressure, extracted by agitation with ether, and the ethereal solution is washed with water, dried, and evaporated. The residue, $\Delta^{5,20,23}$-3-oxy-21-methoxy-24,24-diphenyl-cholatriene, is dissolved without purification in 50 parts by volume of cyclohexanone and 400 parts by volume of toluene. For the purpose of drying 100 parts by volume of toluene are distilled. A solution of 2.5 parts of aluminium isopropylate in 50 parts by volume of pure toluene is introduced dropwise in the course of 30 minutes into the solution while the distillation thereof is slowly continued. The reaction mixture is then cooled, mixed with 50 parts by volume of a concentrated solution of Seignette salt, and steam distilled for 1 hour. The aqueous suspension is then extracted by agitation with ether. The ethereal solution is washed with water, dried, and evaporated, to yield $\Delta^{4,20,23}$-3-keto-21-methoxy-24,24-diphenyl-cholatriene. The latter product is oxidised with 6.5 parts of chromium trioxide in a manner analogous to that described in Example 6, and the oxidation mixture is worked up. In this manner the desoxycorticosterone methyl ether described in Example 6 and melting at 161–165° C. is obtained.

By reacting $\Delta^{20,23}$-3-acetoxy-5-chloro-21-bromo-24,24-diphenyl-choladiene with ethyl alcohol or benzyl alcohol, instead of methyl alcohol, there is obtained in a manner analogous to that described in Example 6 or 7, if desired with the use of an inert solvent such as benzene or dioxane, desoxy-corticosterone ethyl or benzyl ether. The same ethers can also be obtained by reaction with alcoholates for example, sodium or potassium methylate, ethylate or benzylate, dissolved or suspended in the corresponding alcohol or an inert solvent or diluent. In an analogous manner phenol ethers may be obtained with the use of phenols or phenolates.

Example 8

For the preparation of the starting material of this example, $\Delta^{4,20,23}$-3-keto-21-bromo-24,24-diphenyl-cholatriene obtained, for example, by the reaction of 10 parts of $\Delta^{4,20,23}$-3-keto-24,24-diphenyl-cholatriene with bromosuccinimide with exposure to light (Ser. No. 741,954, filed April 16, 1947) is heated with 10 parts of dry potassium acetate in 100 parts of pure glacial acetic acid for 3 hours on the water bath. The solution is concentrated by evaporation under reduced pressure, the residue is mixed with water, and the resulting suspension is extracted by agitation with ether. The ethereal solution is washed with water, dried and evaporated. The $\Delta^{4,20,23}$-3-keto-21-acetoxy-24,24-diphenyl-cholatriene is dissolved in 125 parts by volume of ethylene chloride and 250 parts by volume of glacial acetic acid, mixed with a solution of 8.5 parts of chromium trioxide in 40 parts by volume of water at −5 to −10° C., and allowed to stand for 15 hours at 0° C. The reaction solution is mixed with sodium bisulphite solution at a low temperature and concentrated by evaporation under reduced pressure with the repeated addition of water. The suspension so obtained is extracted by agitation with a mixture of ether and chloroform (4:1), the ether-chloroform solution is washed in turn with dilute sodium carbonate solution and water, dried and evaporated. The residue is crude $\Delta^4$-21-acetoxy-pregnene-3,20-dione (desoxycoticosterone acetate). It may be purified, for example, by chromatography over aluminium oxide. It is of advantage also to recover the product by repeated extraction of a benzene solution thereof with sulphuric acid of 50 per cent. strength by volume, the sulphuric acid solutions being diluted with water and extracted with a mixture of ether and chloroform. The ether-chloroform solutions are washed in turn with dilute sodium carbonate solution and water, dried, and evaporated. The known desoxycorticosterone acetate crystallises from ether in needles melting at 159–161° C. It may be hydrolysed, for example with potassium carbonate in aqueous alcohols to yield free desoxycorticosterone, and the latter may be converted into any other desired ester or ether.

By reacting the $\Delta^{4,20,23}$-3-keto-21-bomo-24,24-diphenyl-cholatriene with propionic acid salts, butyric acid salts or valeric acid salts in propionic acid, butyric acid or valeric acid, respectively, instead of potassium acetate in glacial acetic acid, there is obtained by working up in an analogous manner desoxycorticosterone propionate melting at 164–165° C., desoxycorticosterone-n-butyrate melting at 110–111° C. or desoxycorticosterone-n-valerate melting at 84–86° C., respectively. In an analogous manner there may be obtained, for example, by the action of a salt of palmitic acid, benzoic acid or para-toluene sulphonic acid in an inert solution or diluent such as benzene, toluene, dioxane, chloroform or carbon tetrachloride, the corresponding palmitate melting at 60–61° C., benzoate melting at 210–212° C., or para-toluene-sulphonate melting at 170–172° C. By reacting the bromide with tetracetyl-glucose there is obtained the tetracetyl-glucoside or, after hydrolysis, the glucoside, of desoxycorticosterone.

Example 9

In order to prepare the starting material for this example 10 parts of $\Delta^{11,20,23}$-3-keto-24,24-diphenyl-cholatriene (obtainable, for example, from $\Delta^{20,23}$-3-keto-12-para-toluene-sulphoxy-24,24-diphenyl-choladiene [see Example 4] by heating it for 15 hours with pyridine in an evacuated autoclave at 140° C.) are converted by means of bromo-succinimide into $\Delta^{11,20,23}$-3-keto-21-bromo-24,24-diphenyl-cholatriene. This bromide is then first reacted with potassium acetate in glacial acetic acid in a manner analogous to that described in Example 3, and then oxidised with chromium trioxide. The crude $\Delta^{11}$-21-acetoxy-pregnene-3,20-dione so obtained may be purified and isolated in the manner described in Example 4. It then melts at 151–152° C.

Example 10

The starting material is prepared in the following manner: 3-oxy-11-keto-cholanic acid methyl ester (Helvetica Chimica Acta, vol. 26, page 586 [1943]) is reacted with phenyl-magnesium bromide, water is split off from the resulting 3,24-dioxy-11-keto-24,24-diphenylcholane, the product is then acetylated, and the $\Delta^{23}$-3-acetoxy-11-keto-24,24-diphenylcholene is converted by reaction with bromosuccinimide followed by the splitting off of hydrogen bromide into $\Delta^{20,23}$-3-acetoxy-11-keto-24,24-diphenylcholadiene. By alkaline hydrolysis followed by dehydrogenation with cyclohexanone in the presence of aluminium isopropylate $\Delta^{20,23}$-3,11-diketo-24,24-diphenyl-choladiene is obtained, of which 10 parts are converted by means of bromosuccinimide with exposure to light (Ser. No. 741,954, filed April 16, 1947) into $\Delta^{20,23}$-3,11-diekto-21-bromo-24,24-diphenyl-choladiene.

The bromide recrystallized from ether and acetone, melting at 210° C. with decomposition, is reacted with potassium acetate in glacial acetic acid analogously as described in Example 3, and worked up in the manner set out in said example. The resulting crude $\Delta^{20,23}$-3,11-diketo-21-acetoxy-24,24-diphenyl-choladiene crystallizes from ether or isopropyl ether and melts unsharply at about 180–210° C. It may be used further directly in this form. For the purpose of purification it is hydrolyzed with aqueous potassium carbonate preferably by boiling for one hour in a mixture of methanol and benzene 2:1. The solution is then concentrated in a vacuum with addition of water. The resulting aqueous suspension is shaken out with ether, the ethereal solution washed with water, dried and evaporated. The residue is chromatographed over aluminium oxide, and the column is elutriated with a mixture of hexane and benzene 1:1 and then with benzene. The benzene elutriates contain $\Delta^{20,23}$-2,11-diketo-21-oxy-24,24-diephenyl-choladiene and are evaporated. The residue is mixed with a mixture of aceto-anhydride and pyridine 2:1. The solution is allowed to stand at room temperature for 20 hours, then concentrated in a vacuum with addition of water, the oily residue is dissolved in ether, the ethereal solution is washed with dilute hydrochloric acid and water, dried and evaporated. The $\Delta^{20,23}$-3,11-diketo-21-acetoxy-24,24-diphenyl-choladiene is crystallized in the form of short prisms. These are recrystalized from a little acetone and ether and then melt at 215–217° C. The crude or the pure 21-acetoxy-diene is oxidized with chromium trioxide analogously as described in Example 3. The neutral oxidation product is chromatographed over aluminium oxide and the column is elutriated successively with a mixture of benzene and hexane and benzene, the evaporated fractions which are rich in benzene as well as the pure benzene fractions are recrystallized from ether, ether-pentane, or mixtures of ether and petroleum ether. The 21-acetoxy-pregnane-3,11,20-trione thus obtained melts at 157–160° C.

Simple methods for purifying the mother liquors containing this compound are repeated chromatography over aluminium oxide or to take them up in benzene, extract the solution with sulphuric acid of 50–70 per cent. strength, dilute the sulphuric acid extract with water, and extract it with ether.

Example 11

14 parts by weight of $\Delta^{20,23}$-3-keto-12-acetoxy-21-bromo-24,24-diphenyl-choladiene are converted, according to Example 3, into $\Delta^{20,23}$-3-keto-12,21-diacetoxy-24,24-diphenyl-choladiene. The suspension of this substance in 100 parts by volume of methanol and 15 parts by volume of water is boiled, together with 5.5 parts by weight of potassium carbonate, for one hour. To the clear solution there is then added some water, the reaction mixture is evaporated under reduced pressure and the residue taken up in ether. The ethereal solution is washed with water, dried and concentrated, whereby the $\Delta^{20,23}$-3-keto-12,21-dihydroxy-24,24-diphenyl-choladiene crystallizes. It is recrystallized from acetone, and afterwards melts at 145° C., solidifies to form needles when further heated, and melts definitely at 215–217° C.

10 parts by weight of $\Delta^{20,23}$-3-keto-12,21-dihydroxy-24,24-diphenyl-choladiene are heated for 2 hours at 55° C. with 20 parts by weight of succinic anhydride in 100 parts by volume of pyridine. The clear solution is cooled, diluted with water and concentrated by evaporation in vacuo. The resulting suspension is extracted with an ether-chloroform mixture in the ratio of 4:1. The ether chloroform solution is then briefly washed with dilute hydrochloric acid and water, dried and concentrated. The $\Delta^{20,23}$-3-keto-12-hydroxy - 21 - succinyloxy - 24,24 - diphenyl-choladiene soon crystallizes and is recrystallized from a small quantity of chloroform and ether or from acetone. It melts at 214–215° C.

10 parts by weight of $\Delta^{20,23}$-3-keto-12-hydroxy-21 - succinyloxy - 24,24 - diphenyl-choladiene are suspended in a mixture of benzene and ethyl acetate and mixed with an excess of ethereal solution of diazo-methane. After 30 minutes the solution is clear. It is carefully washed with dilute hydrochloric acid, dilute sodium carbonate solution and water, dried and evaporated. The residue is dissolved in a small quantity of acetone and the solution mixed with methanol, the methyl ester of the $\Delta^{20,23}$-3-keto-12-hydroxy-21-succinyloxy-24,24-diphenyl-choladiene precipitating in the form of crystals. This methyl ester first melts at 175° C. Needles are then formed in the melt which later at 184–185° C. also melt.

5 parts by weight of the methyl ester of the $\Delta^{20,23}$ - 3 - keto - 12 - hydroxy - 21 - succinyloxy-24,24-diphenyl-choladiene and 7 parts by weight of para-toluene-sulfonic acid chloride are dissolved in 25 parts by volume of pyridine. The solution is heated at 38–40° C. for 6 days. It is then carefully diluted with water and extracted with ether. The ethereal solution is washed with dilute hydrochloric acid, a dilute solution of sodium carbonate in water, dried and evaporated. The residue consists of the methyl ester of the $\Delta^{20,23}$ - 3 - keto - 12 - para - toluene - sulfoxy - 21 - succinyloxy-24,24-diphenyl-choladiene.

13 parts by weight of the para toluene sulfonic acid ester are oxidized in 50 parts by volume of ethylene chloride and 150 parts of acetic acid of 80 per cent. strength with 4.3 parts by weight of chromium trioxyd at 0° C. for 20 hours. The oxidation mixture is then poured into 500 parts by volume of dilute sodium disulfite solution. The suspension is extracted with a mixture of ether and chloroform in the ratio of 4:1. The ether-chloroform solution is washed with water, a diluted sodium carbonate solution and again with water and then evaporated. The crude residue is purified by shaking and kneading several times with petroleum ether during which operation the diphenyl derivatives pass into solution and are then decanted. The residual amorphous substance, which is insoluble in petroleum ether, in methanol solution quickly and vigorously reduces an alkaline silver-diammine solution. It is the crude methyl ester of 3,20-diketo-12-para-toluene-sulfoxy- 21-succinyloxy-pregnane, and is subjected to further processing without other purification.

4 parts by weight of the thus obtained amorphous pregnane derivative are dissolved in 20 parts by volume of pyridine and heated to 135–140° C. for 15 hours in an autoclave under reduced pressure (the pregnane derivative may alternatively be boiled in a reflux apparatus with collidine for 5 hours). The cooled solution is then evaporated under reduced pressure and the residue taken up in a mixture of ether and chloroform (4:1). The ether-chloroform solution is washed with dilute hydrochloric acid and water, dried and evaporated. The residue contains the methyl ester of $\Delta^{11}$-3,20-diketo-21-succinyloxy-pregnene. This compound is dissolved in 150 parts by volume of methanol. To this solution are added 2.5 parts by weight of potassium carbonate and 40 parts by volume of water and the reaction mixture is allowed to stand for 15 hours at 20° C. It is then mixed with 1.2 parts by volume of acetic acid and some water, concentrated by evaporation under reduced pressure and the residue extracted with a mixture of ether and chloroform (4:1). The organic solution is washed with water, dried and evaporated. The residue, which contains $\Delta^{11}$-3,20-diketo-21-oxy-pregnene, is mixed with 4 parts by volume of pyridine and 8 parts by volume of acetic anhydride and the solution allowed to stand for 15 hours at 20° C. It is then mixed with water and evaporated under reduced pressure. The residual mixture is extracted with ether and the ethereal solution washed with dilute hydrochloric acid and water, dried and evaporated. The crude residue is then chromatographed, using 60 parts by weight of aluminium oxide. The evaporated last benzene eluates and first benzene-ether eluates yield, from mixtures of ether and petroleum ether, the crystallized $\Delta^{11}$-3,20-diketo-21-acetoxy-pregnene, melting at 151–152° C.

Example 12

9 parts by weight of the amorphous methyl ester of 3,20-diketo - 12 - para-toluene-sulfoxy-21-succinyloxy-pregnane, obtained according to Example 11, are dissolved in 50 parts by volume of acetic acid and mixed in the course of 20 minutes with a solution of 2.3 parts by weight of bromine in 50 parts by volume of acetic acid. The solution is allowed to stand for 20 minutes at the same temperature and then evaporated under reduced pressure at 30° C. The residue is taken up in a mixture of ether and chloroform in the ratio of 4:1, the organic solution is washed with dilute sodium carbonate solution and water, dried and evaporated. There is obtained in this way the amorphous methyl ester of 3-keto-4-bromo-12-para-toluene-sulfoxy - 21 - succinyloxy-pregnane. It is, like the corresponding toluene-sulfonic acid ester of Example 11, either heated to 140° C. for 15 hours in a pressure vessel, or refluxed for 5 hours in collidine. The reaction product is further worked up as indicated in Example 11. The resultant crude methyl ester of $\Delta^{4,11}$-3,20-diketo-21-succinyloxy-pregnadiene is hydrolyzed in diluted methanol with 5.6 parts by weight of potassium carbonate, before it is further worked up according to Example 11. The resulting crude $\Delta^{4,11}$-3,20-diketo-21-oxy-pregnadiene is then dissolved in 8 parts by volume of pyridine and 16 parts by volume of acetic anhydride and the solution allowed to stand for 15 hours at 20° C. It is then diluted with water and evaporated under reduced pressure. The residue is taken up in ether, the ethereal solution washed with dilute hydrochloric acid and water, dried and evaporated. The crude substance thus obtained is chromatographed, using 150 parts by weight of aluminium oxide. From the evaporated benzene-pentane (1:1) fractions and the first benzene fractions there is obtained, upon treating with some ether and allowing to stand for a few hours, the $\Delta^{4,11}$-3,20-diketo-21-acetoxy-pregnadiene (anhydro-corticosterone acetate) in the form of fine needles, which melt after recrystallization at 179–181° C. and have a specific rotation of $$[\alpha]_D^{26} = +169 \pm 3° \text{ (c=0.705 in acetone)}$$

Example 13

For preparing the starting material, $\Delta^{23}$-3-oxy-11-keto-24,24-diphenylcholene (see Example 10) is dehydrogenated with cyclohexanone in the presence of aluminium isopropylate to form $\Delta^{23}$-3,11-diketo-24,24-diphenylcholene, the latter is brominated with 2 mols of bromine, and the resulting product is converted by treatment with dimethylaniline into $\Delta^{4,23}$-3,11 - diketo - 24,24 - diphenyl-choladiene. The latter diene is then brominated with 1 mol of bromo-succinimide while exposing it to light, and the resulting 22-bromide is converted thermically into $\Delta^{4,20,23}$-3,11-diketo-24,24-diphenyl-cholatriene. 5 parts of the latter triene are reacted with 1.76 parts of bromo-succinimide with exposure to light (Ser. No. 741,954, filed April 16, 1947) to yield $\Delta^{4,20,23}$-3,11-diketo-21-bromo-24,24-diphenyl-cholatriene.

In a manner analogous to that described in Example 3 the crude bromide is converted by means of potassium acetate in glacial acetic acid into $\Delta^{4,20,23}$-3,11-diketo-21-acetoxy - 24,24 - diphenyl-cholatriene, and then converted by means of chromium trioxide into $\Delta^4$-21-acetoxy-pregnene-3,11,20-trione. The crude pregnene derivative is purified, for example, by chromatography or by the extraction of a benzene solution thereof with strong sulphuric acid. After recrystallization from acetone the resulting 11-dehydro-corticosterone acetate melts at 175–178° C.

Having thus described the invention, what is claimed is:

1. A process for the manufacture of a pregnane derivative which is substituted in the 21-position, which comprises subjecting a $\Delta^{20,23}$-choladiene, which in the 21-position contains a member selected from the group consisting of an esterified and an etherified hydroxyl group and a halogen atom, to the action of a compound of hexavalent chromium whereby the conjugated double bond is split, with formation of the 20-ketone.

2. A process for the manufacture of a pregnane derivative which is substituted in the 21-position, which comprises subjecting a $\Delta^{20,23}$-24,24-diaryl-choladiene, which in the 21-position contains a member selected from the group consisting of an esterified and an etherified hydroxyl group and a halogen atom, to the action of a compound of hexavalent chromium whereby the conjugated double bond is split, with formation of the 20-ketone.

3. A process for the manufacture of a pregnane derivative which is substituted in the 21-position, which comprises subjecting a $\Delta^{20,23}$-24,24-diphenyl-choladiene, which in the 21-position contains a member selected from the group consisting of an esterified and an etherified hydroxyl group and a halogen atom, to the action of a compound of hexavalent chromium whereby the conjugated double bond is split, with formation of the 20-ketone.

4. A process for the manufacture of a pregnane derivative which is substituted in the 21-position, which comprises subjecting a $\Delta^{20,23}$-24,24-diphenyl-choladiene, which in the 21-position contains a member selected from the group consisting of an esterified and an etherified hydroxyl group and a halogen atom and in the 3-position a member selected from the group consisting of an esterified and etherified hydroxyl group and a keto group, to the action of a compound of hexavalent chromium whereby the conjugated double bond is split, with formation of the 20-ketone.

5. A process for the manufacture of a pregnane derivative which is substituted in the 21-position, which comprises subjecting a $\Delta^{20,23}$-24,24-diphenyl-choladiene, which in the 21-position contains a member selected from the group consisting of an esterified and an etherified hydroxyl group and a halogen atom and in position 3 and in one of the positions 11 and 12 a member selected from the group consisting of a hydroxyl group esterified with a carboxylic acid and a hydroxyl group esterified with a sulphonic acid, an etherified hydroxyl group and a keto group, to the action of a compound of hexavalent chromium whereby the conjugated double bond is split, with formation of the 20-ketone.

6. A process for the manufacture of a pregnane derivative which is substituted in the 21-position, which comprises subjecting a $\Delta^{20,23}$-3,11-diketo-21-acyloxy-24,24-diphenyl-choladiene to the action of a compound of hexavalent chromium whereby the conjugated double bond is split, with formation of the 20-ketone.

7. A process for the manufacture of a pregnane derivative which is substituted in the 21-position, which comprises subjecting a $\Delta^{4,20,23}$-3,11-diketo-21-acyloxy-24,24-diphenyl-cholatriene to the action of a compound of hexavalent chromium whereby the conjugated double bond is split, with formation of the 20-ketone.

8. A process for the manufacture of a pregnane derivative which is substituted in the 21-position, which comprises subjecting a $\Delta^{4,20,23}$-3,11-diketo-21-acetoxy-24,24-diphenyl-cholatriene to the action of a compound of hexavalent chromium whereby the conjugated double bond is split, with formation of the 20-ketone.

9. A process for the manufacture of a pregnane derivative which is substituted in the 21-position, which comprises subjecting a $\Delta^{20,23}$-21-halogen-choladiene to the action of a compound of hexavalent chromium whereby the conjugated double bond is split, with formation of the 21-halogen-pregnane-20-one.

10. A process according to claim 1, wherein the $\Delta^{20,23}$-choladiene contains a free nuclear carbinol group, whereby the latter is converted into a keto group simultaneously with the oxidative degradation of the side chain.

11. A process according to claim 1, wherein the oxidation reaction is performed while nuclear double bonds and oxidisable substituents are protected.

12. A process according to claim 1, wherein the obtained product is purified by taking it up in an organic solvent immiscible with water, extracting the solution with a strong mineral acid, and precipitating the product from the mineral acid solution by means of water.

ALBERT WETTSTEIN.
CHARLES MEYSTRE.

REFERENCES CITED

The following references are of record in the file of this patent:

UNITED STATES PATENTS

| Number | Name | Date |
|---|---|---|
| 2,296,284 | Julian | Sept. 22, 1942 |
| 2,461,563 | Miescher | Feb. 15, 1949 |